United States Patent [19]
Addams

[11] Patent Number: 5,218,927
[45] Date of Patent: Jun. 15, 1993

[54] COLLAPSIBLE PORTABLE BIRD PERCH

[76] Inventor: Nicholas A. Addams, 1401 - 21st Street, N.W., Washington, D.C. 20036

[21] Appl. No.: 744,937

[22] Filed: Aug. 14, 1991

[51] Int. Cl.$^5$ ............................................ A01K 31/12
[52] U.S. Cl. ........................................ 119/26; 119/24
[58] Field of Search .............................. 119/23, 24, 26; 108/128, 157

[56] References Cited

U.S. PATENT DOCUMENTS

| | | | |
|---|---|---|---|
| D. 76,406 | 9/1928 | Leon | 119/26 |
| D. 175,292 | 9/1955 | Austgen | 119/26 |
| 910,298 | 1/1909 | Lindemann | 119/26 |
| 3,083,066 | 3/1963 | Bedol | 108/157 |
| 3,181,504 | 5/1965 | Stortz | 119/24 |
| 3,810,445 | 5/1974 | Stadler | 119/26 |
| 5,010,848 | 4/1991 | Rankin | 119/26 |

Primary Examiner—Cary E. O'Connor
Assistant Examiner—Cindy A. Cherichetti

[57] ABSTRACT

The present invention is a portable and completely collapsible bird perch, that can be quickly disassembled into a convenient size for relocating a bird handily from one place to another, such as taking the bird to work, room to room within a house, to someone else's house, outdoors, etc, and reassembling it in a few seconds.

The present invention comprises a base, a sitting perch bar rigidly connected perpendicularly to one of two or more vertical rigid support sticks, a coupling to rigidly connect the sticks together, a means in the base to rigidly connect the sticks to the base, and clips on the underside of the base to hold the sticks and perch bar when the perch is disassembled. When the bird is to be relocated to another place, the sticks and perch are removed from the clips and the sticks are connected together using the coupling to form an elongated "T" section, the end of which is connected into the base, thereby assembling the perch in a few seconds.

6 Claims, 1 Drawing Sheet

U.S. Patent June 15, 1993 5,218,927
FIG. 2
FIG. 1
FIG. 3
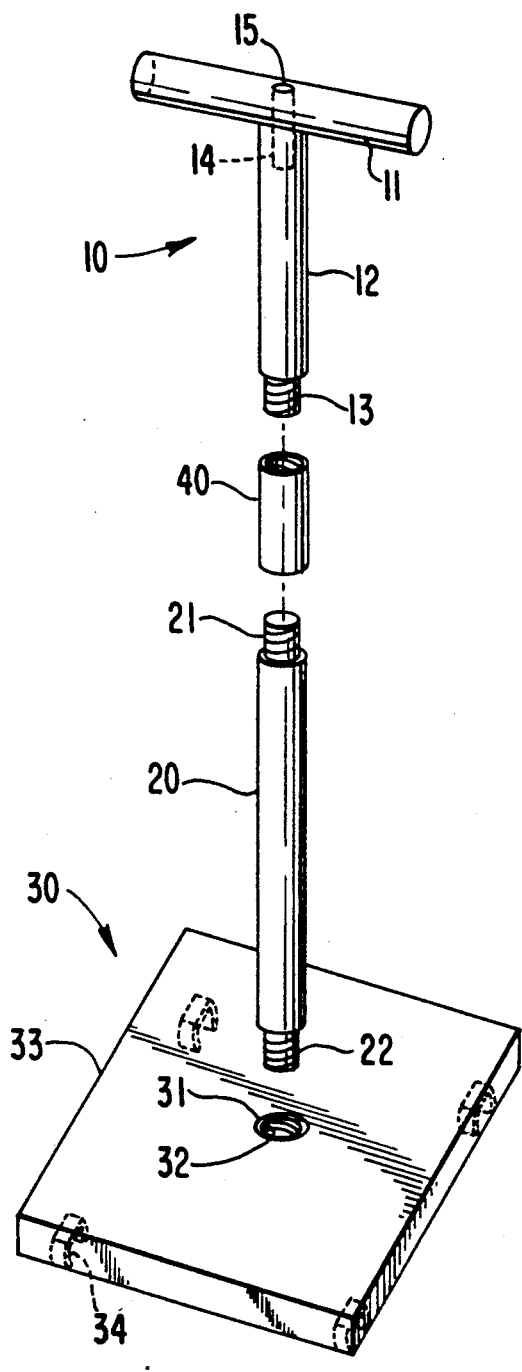
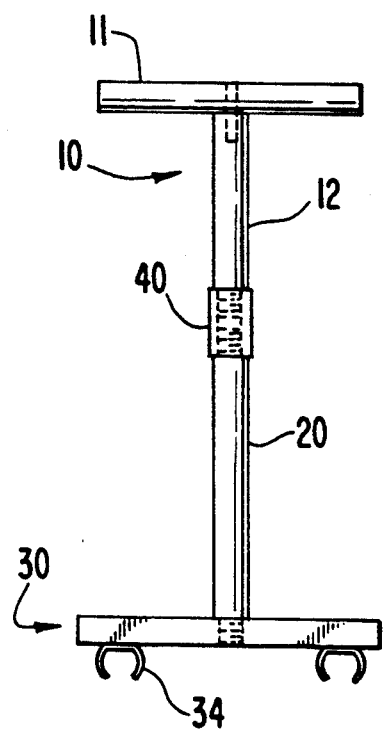
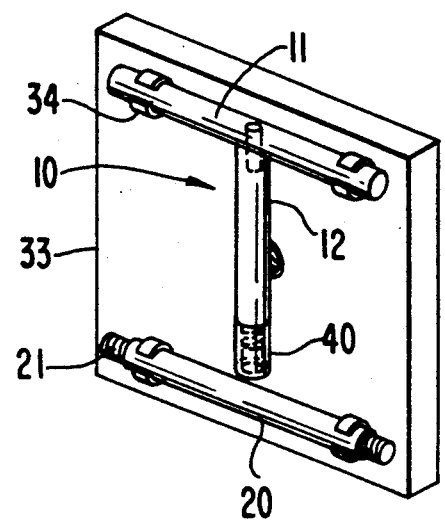

COLLAPSIBLE PORTABLE BIRD PERCH

BACKGROUND OF THE INVENTION

This invention generally relates to bird equipment, and more particularly to an improved portable bird perch which is completely collapsible.

Bird perches are usually permanently affixed to bird houses or cages, or free standing permanent stands. Some are designed for attachment to other objects, such as golf carts, etc., U.S. Pat. No. 4,497,178. Sometimes more complicated structures are involved, such as the parrot platform in U.S. Pat. No. 4.810,445, and the bird ladder in U.S. Pat. No. 2,690,159, or attachments such as bird dropping trays, U.S. Pat. No. 2,731,949 along with a suction cup for attaching to a solid wall, mirror or the like, U.S. Pat. No. 2,720,188.

There appears to be no known portable bird perch which is completely collapsible quickly, so that the bird owner can collapse the bird perch quickly into a convenient size for carrying, to facilitate relocating the bird handily from one place to another, such as taking the bird from the owner's home to someone else's home, or to the office, or outdoors, or from room-to-room within the home, and the like: And upon arrival at the new place, the bird perch can be quickly assembled in a few seconds.

SUMMARY OF THE INVENTION

This invention provides such a unique collapsible portable bird perch. It comprises 3 major components; namely (A) an upper "T" section including the sitting perch or bar for the bird, (B) an extension section or stick easily connectible to the "T" section, and (C) a base element to which the "T" section and extension section or stick are quickly connectible to, the base having clips or other means to secure the "T" section and the extension stick to it, so that the collapsible perch can be readily carried from place to place as a unit.

DRAWINGS

FIG. 1 is a front view of the perch showing it fully assembled.

FIG. 2 is a perspective view of the 3 major elements of the perch, separated and ready for assembly.

FIG. 3 is a perspective view of the underside of the perch having the "T" section and extension section temporarily attached thereto for portability.

FIG. 1

FIG. 1 shows an embodiment of the collapsible portable bird perch in its assembled configuration. There is shown a "T" assembly section 10, a support section or stick 20, and a base assembly 30.

"T" assembly 10 comprises a sitting bar 11 affixed horizontally to a verticle support stick or pole 12. Stick 12 is connected to support stick 20 in such a manner as to be assembled or disassembled easily, to be described more fully in connection with FIG. 2. "T" assembly 10 and support stick 20 form a rigid elongated "T" section, which is then connected to the base assembly 30 in such a manner so as to be easily assembled and disassembled, to be described more fully in connection with FIG. 2. It is obvious that additional support sticks 20 can be connected to form a longer rigid "T" assembly so that the sitting bar 11 is a further distance from the base 30 making the bird higher and further away from the base. The final "T" assembly is affixed to the base 30 so that sitting bar 11 is perpendicular to the support stick 20 and parallel to the base assembly 30.

DETAILED DESCRIPTION OF A PREFERRED EMBODIMENT

Referring now to FIG. 2, sitting bar 11 is a circular piece of wood, but can be made of other materials such as plastic or metal, or even a tree branch. Bar 11 and support stick 12 is threaded on the lower end 13 and has a small hole 14 drilled therein at the upper end. Support stick 12 is shown circular in cross section, but can obviously have other shapes such as square, etc. Sitting bar 11 is secured to support stick 12 by a dowel 15 which is driven through a hole in the sitting bar so that part of the dowel is driven into the hole 14, thus forming a relatively rigid connection between sitting bar 11 and support stick 12, so that the sitting bar 11 is perpendicular to stick 12. Other means of connecting sitting bar 11 to support stick 12, other than by means of a dowel, can be easily recognized, such as a screw method, among others.

Support stick 20 is threaded on both ends at 21 and 22, having the same thread configuration as thread 13 on stick 12. A coupling 40 is employed to connect support stick 20 to stick 12, and has internal threads which match the external thread 13 and 21 of the sticks 12 and 20, respectively. Thus, "T" assembly 10 and support stick 20 can be quickly and readily connected using coupling 40 by screwing them together to form a rigid, elongated new "T" assembly. It is obvious that additional sticks 20 can be connected using additional couplings 40, so that sitting bar 11 can be a greater distance away from base assembly 30. It is also apparent that other means of quickly assembling and disassembling "T" stick 10 and support assembly 20 can be envisioned.

Base assembly 30 has a base 33 made of wood which has a hole 31 drilled in the center thereof. Base 30 can be made of other materials, such as plastic, metal, etc. Driven into hole 31, is a coupling 40, or one-half of a coupling 40, if it is desired that base 33 have a relatively flush surface after coupling 40 is driven into the base.

Having pre-assembled "T" section 10 and support stick 20 together, this elongated "T" assembly can be assembled to the base 33 by threading the threads 22 of stick 20 into the half or full coupling 32, so that the elongated "T" assembly is rigidly connected to base 33. Other methods of connecting the elongated "T" assembly to base 33 can be envisioned, so that it is relatively easily and quickly assembled and disassembled.

It is apparent that sitting bar 11 can be placed closer or further away from the base assembly 30, merely by using additional support sticks 20 and connecting them together with couplings 40.

Referring now to FIG. 3, there is shown the underside of base assembly 30. Attached to the underside of base 33, are four spring clips 34, secured by a screw or other means. Spring clips 34 can be made of metal, plastic, or other resilient spring-like material, that is of a diameter to accommodate and to hold relatively firmly in place sitting bar 11, but also permits sitting bar 11 to be readily removed therefrom. The other spring clips 34 receive support stick 20 in the same manner. Sitting bar 11 and support stick 20 are of the same diameter for manufacturing convenience and assembly convenience, but need not necessarily be of the same diameter, as long as a coupling means 40 will receive the different threads, etc., of sticks, 12 and 20.

Additional support sticks 20 can be mounted to base 33 by adding additional sets of clips 34, if it is desired to place sitting bar 11 a further distance away from base 33 after assembly. FIG. 3 shows the perch in its collapsed configuration, ready to be easily carried from place to place. The perch can be carried by gripping the sitting bar 11 or support stick 20, which affectively acts as a handle to enable carrying of the perch.

Having thus described various parts of a preferred embodiment and variations of the instant collapsible portable bird perch, it can be seen that it is relatively quick and simple to assemble and disassemble. A bird owner, veterinarian or other person, merely removes the "T" assembly 10 and support stick 20 from clips 34 on the base 33, and turns the base upside down so that the clips are on the surface upon which the perch will ultimately be placed, such as a counter, desk, table, or the like. "T" assembly 10 is connected to support stick 20 using coupling 40, which is shown as connected to stick 12 in FIG. 3, but can just as well be left connected to stick 20 when in the collapsed position. The connected together "T" assembly 10 and support assembly 20 (one or more assemblies 20) are then screwed into the base 33. The entire assembly process can be as quick as 15 or 20 seconds. Alternately, stick 20 can be screwed into base 33, and "T" assembly 10 then connected to support stick 20 using coupling 40.

Having thus described a preferred embodiment of the invention it is to be understood that further modifications, changes, alterations, and additions in the shape, size and arrangement of its parts may be made or resorted to, without departing from the spirit of the invention, all of which are within the scope of the appended claims.

What is claimed is:

1. A collapsible portable bird perch comprising
   (a) a base,
   (b) a sitting perch bar,
   (c) two or more rigid support sticks, one of which is attached perpendicularly to said sitting bar to form a "T" assembly,
   (d) means for quickly and rigidly connecting said support sticks together in a vertical line to form a rigid elongated "T" assembly, but in a manner that said sticks can be quickly disconnected,
   (e) means for quickly connecting said elongated "T" assembly perpendicularly and rigidly to said base, so that said "T" assembly can be connected and disconnected quickly,
   (f) means for removably attaching said bar, and said sticks to said base when said perch is unassembled, so that said perch can be moved from place-to-place and so that said sticks and bar can be quickly removed from the base to rapdily assemble said perch.

2. The collapsible portable bird perch of claim 1, wherein said support sticks have externally threaded ends, and said stick connecting means comprises a coupling having internal threads matching said end threads of said sticks.

3. The collapsible portable bird perch of claim 2, wherein said means for connecting said elongated "T" assembly to said base, comprises an internally threaded hole in said base to receive the matching externally threaded end of said support stick of said "T" assembly.

4. The collapsible portable bird perch of claim 3, wherein said means for removably attaching said bar and said sticks to said base when unassembled, comprise spring clips attached to said base.

5. The collapsible portable bird perch of claim 2, wherein when said bar and said sticks are disassembled from each other and removably attached to said base in a plain parallel to said base, then either said bar or said stick function as a carrying handle.

6. The collapsible portable bird perch of claim 5, wherein when said bar and said stick are disassembled from each other and removably attached to said base in a plane parallel to said base, then either said bar or said stick function as a carrying handle.

* * * * *